United States Patent [19]
Leinen et al.

[11] Patent Number: 6,029,702
[45] Date of Patent: Feb. 29, 2000

[54] VALVE WITH INTERNAL DIFFUSER

[75] Inventors: Chris M. Leinen, Austin; Stephen S. Hodgson, Houston, both of Tex.

[73] Assignee: Dresser Equipment Group, Inc., Carrollton, Tex.

[21] Appl. No.: 08/813,805

[22] Filed: Mar. 6, 1997

[51] Int. Cl.$^7$ ....................................................... F16K 5/12
[52] U.S. Cl. ...................................... 137/625.32; 251/121
[58] Field of Search ........................ 137/625.32, 614.17, 137/625.31; 251/121, 117, 118, 120

[56] References Cited

U.S. PATENT DOCUMENTS

| | | | |
|---|---|---|---|
| 2,585,290 | 2/1952 | Walker | 251/121 X |
| 3,700,003 | 10/1972 | Smith | 137/614.17 |
| 3,707,161 | 12/1972 | Crawford | 137/614.17 |
| 3,860,032 | 1/1975 | Rogers | 137/614.17 |
| 4,111,229 | 9/1978 | Christian | 137/614.17 |
| 4,150,692 | 4/1979 | Wolf | 137/614.17 |
| 4,230,154 | 10/1980 | Kalbfeish | 137/614.17 |
| 4,973,406 | 11/1990 | Ponzielli | 210/333.1 |

*Primary Examiner*—John Fox
*Attorney, Agent, or Firm*—Akin, Gump, Strauss, Hauer & Feld

[57] ABSTRACT

An internal diffuser on a diffuser stem is disposed in a bore of a rotary control valve for attenuating vibration in gas service or cavitation in liquid service. The valve has a valve body and a valve element, and the valve element is rotatable with respect to the internal diffuser. The internal diffuser can be rotatable or non-rotatable with respect to the valve body. The valve element has a valve stem, and the internal diffuser can be arranged coaxially with the valve stem, but this is not a necessary requirement. In one embodiment the internal diffuser is positioned in the bore of the valve element, and the diffuser stem is parallel with the valve stem and spaced laterally apart from it. In another embodiment the internal diffuser is located in the bore of the valve outside of the valve element in either an inlet or an outlet passage of the valve body. The diffuser stem has an axis which can be nonparallel with respect to the axis of the valve stem. A valve actuator is provided for rotating the valve element, and where the internal diffuser is rotatable, a diffuser actuator is provided for rotating the internal diffuser. The diffuser actuator can be fixed to a plate securing the valve actuator so that the valve element and the internal diffuser first rotate together before an independent adjustment is made for rotating the internal diffuser. Where the internal diffuser is rotatable with respect to the valve body, the valve actuator and the diffuser actuator can be manipulated by a control system, the control system having inputs, outputs and logic for rotating the valve element and the internal diffuser into desired positions.

30 Claims, 10 Drawing Sheets

VALVE WITH INTERNAL DIFFUSER

CROSS-REFERENCE TO RELATED APPLICATIONS

This application claims the benefit of and priority to U.S. Provisional Application Ser. No. 60/035959, filed Jan. 21, 1997, having identical title and inventors as the present patent application.

STATEMENT REGARDING FEDERALLY SPONSORED RESEARCH

Not Applicable.

BACKGROUND OF THE INVENTION

1. Field of the Invention

The present invention relates to flow in pipes and control valves, and more particularly, to attenuation of vibration, cavitation and noise in a flow control valve using an internal diffuser.

2. Description of the Related Art

Flow control valves are used to regulate fluid flow by introducing a pressure drop in a fluid stream, regulating flow by varying the pressure drop. Under certain conditions localized high-pressure drops occur, causing vibration and noise problems in a gas service or cavitation in a liquid service. Efforts have been made to avoid localized high-pressure drops by spreading an overall pressure drop among different components of the valve.

For cavitation or noise attenuation, it is desirable to spread the pressure drop taken by a valve over as many components within the valve as possible. Each component has a pressure drop ratio, a ratio of pressure drop divided by inlet pressure to that component. Under specified conditions, a valve must restrict flow which results in an overall pressure drop. This overall pressure drop is divided among the various components within the valve that contribute to flow restriction and thus to the overall pressure drop. The more components there are in a valve for taking pressure drops, the lower the pressure drop ratio for each component.

In U.S. Pat. No. 5,437,305, an inlet diffuser is placed in an inlet to a valve body. The inlet diffuser has a plurality of holes or a plurality of teeth or tines extending into an inlet bore. A portion of the pressure drop through the valve is taken across the inlet diffuser. Diametrically opposite the inlet diffuser, a valve passage inlet diffuser is placed which extends inwardly into a bore in a valve element. As the valve is throttled, the valve passage inlet diffuser meshes with the inlet diffuser to restrict flow through the valve. The pressure drop through the valve is further spread throughout the valve by including a valve passage outlet diffuser. Although improvements such as these have been made in valves to attenuate vibration, cavitation and noise, there remains a need for further improvements.

SUMMARY OF THE INVENTION

The present invention provides a valve having an internal diffuser and a valve element, wherein the valve element is rotatable with respect to the internal diffuser. The internal diffuser provides a flow restriction within the valve for reducing vibration or cavitation. The valve has a bore, and the internal diffuser is positioned within the bore on a diffuser stem. The internal diffuser has a position where it provides minimal flow restriction.

In a valve having a valve body and a valve element disposed in the valve body, the internal diffuser is placed in the bore of the valve element in one embodiment. The internal diffuser has a diffuser stem which is coaxial with a valve stem provided for rotating the valve element in this embodiment, but in other embodiments the diffuser stem is not coaxial. The valve element is rotatable with respect to the internal diffuser; however, the internal diffuser may be fixed with respect to the valve body or it may be rotatable with respect to the valve body. Where the internal diffuser is fixed with respect to the valve body and disposed in the bore of the valve element, rotation of the valve element towards a closed position causes fluid to be forced through openings provided in the internal diffuser, the internal diffuser thus restricting flow. This flow restriction provides an additional component within the valve for taking pressure drop.

In another embodiment the internal diffuser is provided in the valve bore either upstream or downstream of the valve element. In a case where the internal diffuser is rotatable with respect to the valve body, a diffuser actuator is provided for rotating the internal diffuser, the internal diffuser being mounted on a diffuser stem which extends through the valve body for connection to the diffuser actuator. A valve actuator is provided for rotating the valve element with respect to the internal diffuser as well as with respect to the valve body. A control system incorporates the valve actuator and the diffuser actuator, manipulating each to achieve a desired objective, such as, for example, flow control or noise attenuation.

The internal diffuser restricts fluid flow and includes any configuration for that purpose. Example configurations include perforated and unperforated disks, parallel perforated disks, a perforated disk mounted eccentrically with a diffuser stem, a perforated disk having extensions transverse to a perforated plate, and a spherical ball of tubes having perforations through sidewalls of the tubes so that fluid can flow through the perforations.

BRIEF DESCRIPTION OF THE DRAWINGS

A better understanding of the present invention can be obtained when the following detailed description of various embodiments of the invention is considered in conjunction with the drawings, which are described as follows.

DETAILED DESCRIPTION OF THE PREFERRED EMBODIMENTS

Figure 1:
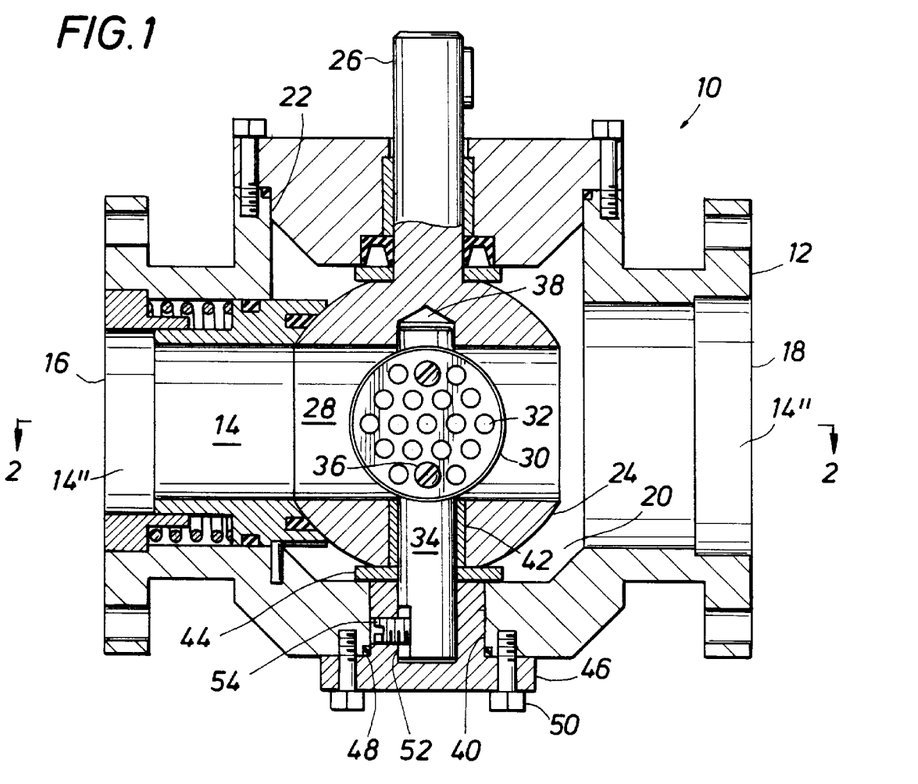
FIG. 1 is a cross section of a valve having an internal diffuser according to the present invention.
Figure 2:
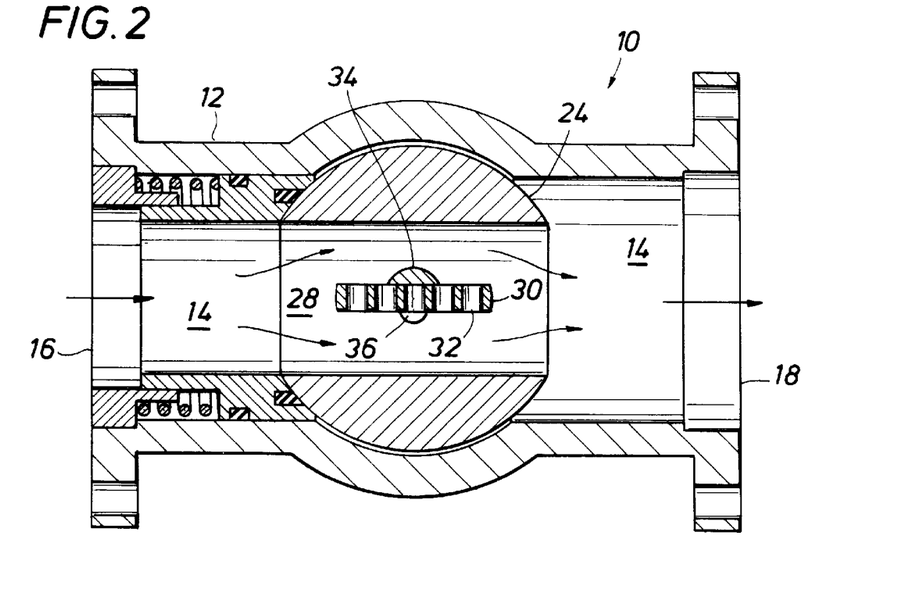
FIG. 2 is a cross section of the valve of FIG. 1 as seen along the lines 2—2.
Figure 3:
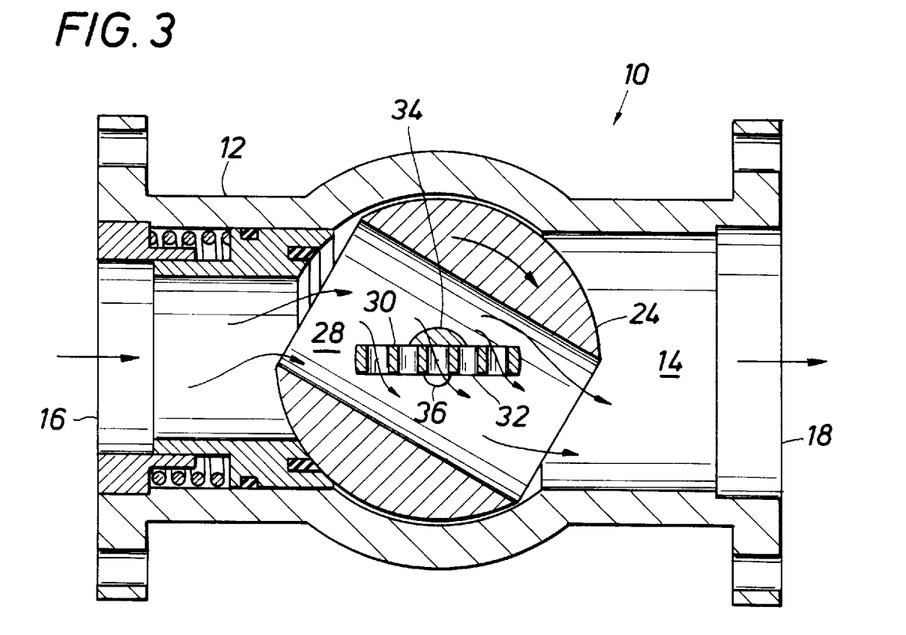
FIG. 3 shows the valve element of FIG. 2 in a partially opened position.
Figure 4:
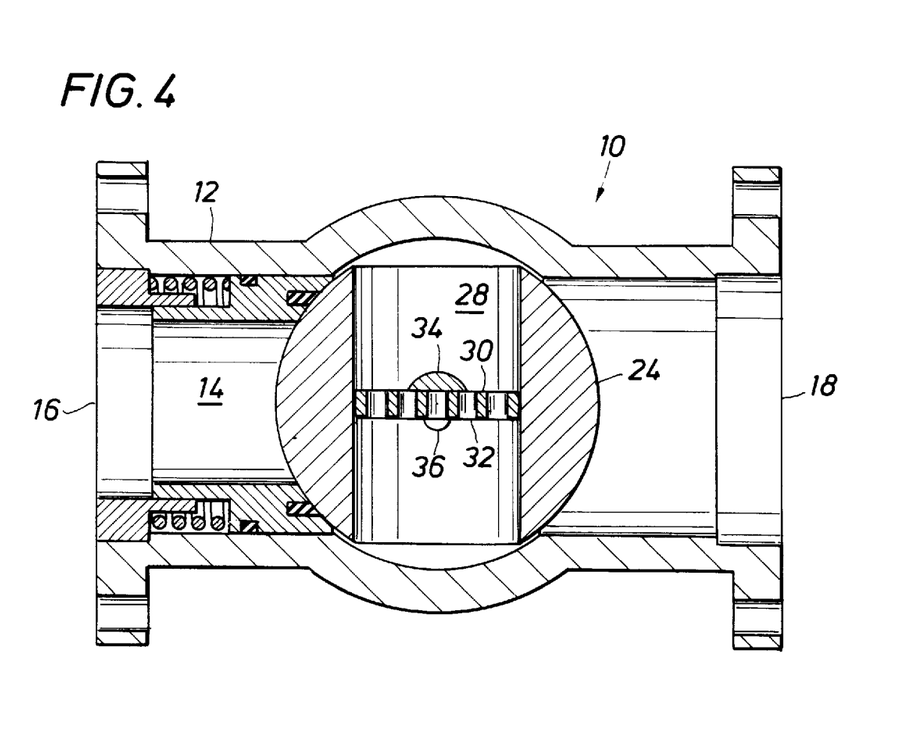
FIG. 4 shows the valve element of FIG. 2 in a fully closed position.

With reference to FIGS. 1–4, a rotary ball valve 10 is shown schematically in cross section, according to the present invention. Valve 10 has a body 12, body 12 having a bore 14, an inlet 16 and an outlet 18. Valve body 12 has a valve element cavity 20 and a port 22 for receiving a valve element 24. A valve stem 26 provides an extension for rotating valve element 24, typically by an actuator. In a conventional manner, valve element 24 rotates through a 90° arc between a fully open position as illustrated in FIG. 1, and a fully closed position, as illustrated in FIG. 4, with intermediate positions in between as illustrated in FIG. 3. Valve body 12 has an inlet passage 14' and an outlet passage 14".

Valve element 24 has a bore 28 which is selectively alignable with bore 14 of body 12 for providing a fluid passageway. An internal diffuser 30 is provided in bore 28 of valve element 24. Internal diffuser 30 has openings 32 for fluid flow through internal diffuser 30. Internal diffuser 30 is attached to a diffuser stem 34 by bolts 36 for purposes of illustration. Valve element 24 has a bore 38 drilled into it for receiving diffuser stem 34. Valve body 12 has a diffuser stem port 40 for allowing installation of diffuser stem 34 into valve element 24. A diffuser bearing 42 is provided about diffuser stem 34 for rotation of valve element 24 about diffuser stem 34. A washer 44 having a diameter greater than that of the diffuser stem port 40 is provided for supporting valve element 24 and diffuser bearing 42. A diffuser cover plate 46, sealed by a seal 48 and fastened by bolts 50, holds diffuser stem 34 in a longitudinally fixed position. Diffuser stem 34 has a key slot 52 for receiving a key 54. Key 54 is engaged with key slot 52 to prevent rotation of diffuser stem 34. Thus, diffuser stem 34 is held in a fixed position relative to valve body 12, yet valve element 24 is free to rotate about diffuser stem 34.

With reference now to FIGS. 2–4, valve 10 is shown as seen along the lines 2—2 in FIG. 1. When valve element 24 is in a fully open position with bore 28 in alignment with bore 14, then internal diffuser 30 provides minimal restriction for fluid flow through valve 10. Flow stream lines are shown as arrows with the flow splitting and passing on either side of internal diffuser 30 (FIG. 2). Internal diffuser 30 is shown here fitted to a milled side of diffuser stem 34, but alternatively, for example, internal diffuser 30 can have a hole for receiving diffuser stem 34.

As valve element 24 is rotated into an intermediate position between fully open and fully closed, fluid flows through openings 32 in internal diffuser 30 (FIG. 3). Thus, internal diffuser 30 provides an additional component in valve 10 for taking pressure drop, which spreads the overall pressure drop through valve 10 over an additional component in the valve. By helping to decelerate the flow, internal diffuser 30 reduces the likelihood of having a localized high-pressure drop which can cause vibration or cavitation in valve 10. Because internal diffuser 30 with its openings 32 provides an additional component for taking pressure drop in valve 10, internal diffuser 30 attenuates vibration, cavitation and noise and has application in either gas or liquid service. In this embodiment valve element 24 rotates about diffuser stem 34 and internal diffuser 30. As valve element 24 rotates toward its closed position, the flow restriction offered by internal diffuser 30 increases. When valve element 24 is in a fully open position (FIG. 2), internal diffuser 30 takes a minimal pressure drop. However, when valve element 24 is in an intermediate position (FIG. 3), internal diffuser 30 takes a greater pressure drop. Internal diffuser 30 offers its greatest flow restriction when valve element 24 is in a nearly closed position.

Figure 5:
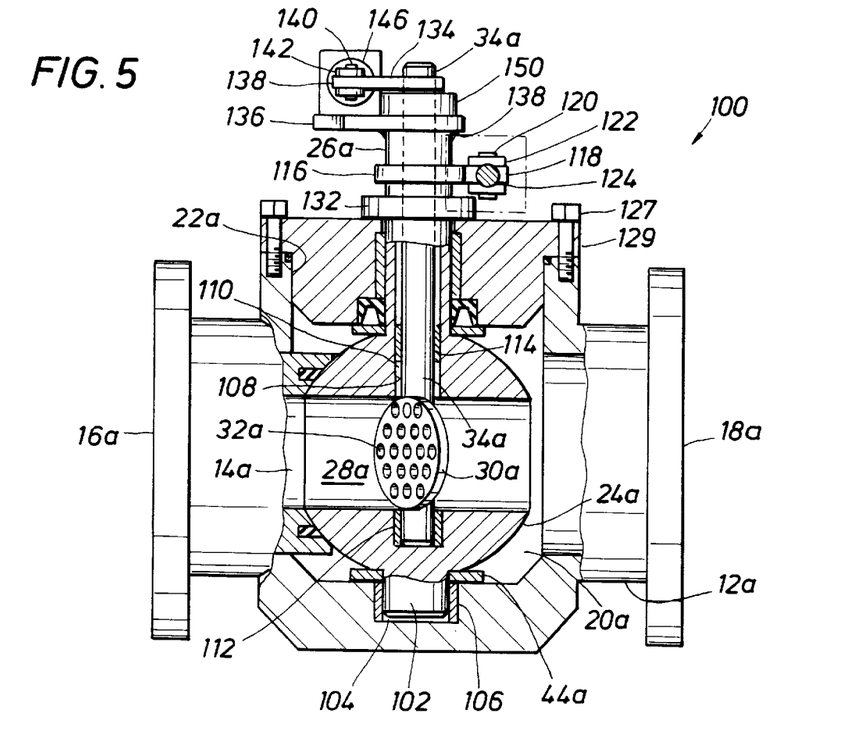
FIG. 5 is a partial cross section of a valve having an internal diffuser according to the present invention.
Figure 6:
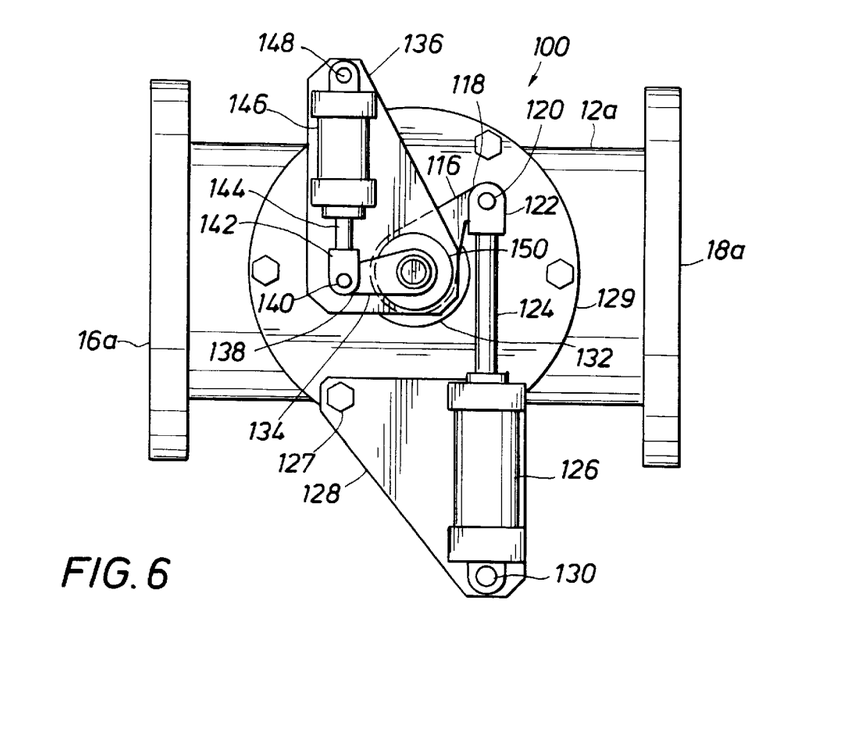
FIG. 6 is a top view of the valve of FIG. 5 illustrating actuators for rotating both the valve element and the internal diffuser.

Turning now to FIG. 5, a valve 100 is shown in partial cross section, and a top view of valve 100 is shown in FIG. 6. In this embodiment and in subsequent embodiments described below, like numbers having letter suffixes are used to connote similar components or components providing a similar function. Thus, an internal diffuser 30a is similar to internal diffuser 30 shown in FIGS. 1 to 4. Valve 100 has a valve body 12a which has a bore 14a through it, an inlet 16a and an outlet 18a. Valve 100 has a valve element cavity 20a and a port 22a for receiving a valve element 24a. Valve element 24a has a valve stem 26a and a bore 28a. Internal diffuser 30a may have openings 32a, or it may be a solid disk having a diameter less than the diameter of bore 28a.

Valve element 24a has a valve stem extension 102, and valve body 12a has a valve stem extension cavity 104 for receiving valve stem extension 102. A trunnion bearing 106 is provided in valve stem extension cavity 104 for providing a bearing surface for valve stem extension 102. Valve element 24a rests on a washer 44a adjacent to trunnion bearing 106. Valve stem extension 102 rotates within trunnion bearing 106.

Valve stem 26a and valve element 24a have a bore 108 for receiving a diffuser stem 34a. Diffuser stem 34a fits concentrically within valve stem 26a defining an annular space 110 between an outside surface of diffuser stem 34a and an inside surface of valve stem 26a. A lower bearing 112 is placed in annular space 110 at a lower end of bore 108. An upper bearing 114 is provided in annular space 110 towards an upper end of valve element 24a. Lower bearing 112 and upper bearing 114 provide bearing surfaces so that internal diffuser 30a and diffuser stem 34a can rotate, diffuser stem 34a rotating within valve stem 26a.

An actuator arrangement for valve 100 is shown in FIG. 6. A bracket 116 is fastened to an outside surface of valve stem 26a, typically by welding. Bracket 116 has an extension 118, and extension 118 has a hole (not shown) for receiving a pin 120 which holds a pivot 122. A piston rod 124 is attached to pivot 122, and a cylinder 126 drives piston rod 124 to and fro. Cylinder 126 and piston rod 124 are a conventional means for rotating a ball valve element. A plate 128 is fastened by bolts 127 to a bonnet 129. A bolt 130 fastens cylinder 126 to plate 128. Cylinder 126 through piston rod 124 and bracket 116 rotates valve element 24a between a fully open and a fully closed position. A positioner 132 can be used to locate valve element 24a in intermediate positions. Positioner 132 is a conventional positioner which provides a feedback mechanism to cylinder 126 for positioning valve element 24a in a desired position, selectively aligning bore 28a of valve element 24a with bore 14a of valve body 12a. Thus, valve element 24a can be rotated in a relatively conventional manner.

Internal diffuser 30a is rotated independently of valve element 24a. A bracket 134 is fixed to diffuser stem 34a, typically by welding. A plate 136 is fastened to valve stem 26a, typically by welding as indicated by beads 138. Plate 136 rotates with valve stem 26a since plate 136 is fixed to valve stem 26a. Bracket 134 has an extension 138 which has a hole (not shown) for receiving a pin 140. A pivot 142 is fastened to extension 138 by pin 140. A piston rod 144 connects to pivot 142, and a cylinder 146 drives piston rod 144 to and fro. A bolt 148 fastens cylinder 146 to plate 136. Thus, cylinder 146 is fixed to plate 136 and can rotate internal diffuser 30a by extending or retracting piston rod 144. A positioner 150 is provided for cylinder 146, positioner 150 providing a feedback indication for the position of diffuser stem 34a relative to valve stem 26a. Thus diffuser stem 34a and, consequently, internal diffuser 30a can be rotated to a desired position and that position can be maintained using positioner 150. If piston rod 144 is held fixed, then as valve element 24a rotates, internal diffuser 30a rotates concurrently with valve element 24a, holding a constant relative position to valve element 24a although internal diffuser 30a rotates relative to valve body 12a.

With valve 100 internal diffuser 30a can be used to provide a variable flow resistance for fluid flowing through bore 14a of valve body 12a and bore 28a of valve element 24a. Valve 100 provides a great deal of flexibility for responding to various flow conditions and attenuating noise while reducing flow through valve 100. While valve element 24a is in an intermediate position with bore 28a in partial alignment with bore 14a, internal diffuser 30a can be rotated a full 90 degrees between a fully opened position and a fully closed position or into intermediate positions. Internal diffuser 30a can be rotated to a relative position with respect to valve element 24a and left there or a controller (not shown) can be used to adjust the relative location of internal diffuser 30a with respect to valve element 24a depending on fluid flow conditions so as to minimize vibration or cavitation, depending on whether the service is gas or liquid, respectively. The controller can receive a flow signal for adjustment of the position of internal diffuser 30a, or, for example, it can receive a vibration signal for adjustment of internal diffuser 30a to minimize vibration.

Other or additional parameters can be sensed for incorporation in a control strategy for manipulating the position of internal diffuser 30a. In any case internal diffuser 30a provides another component within valve 100 for reducing flow by taking pressure drop. By spreading the pressure drop out through as many components as possible within valve 100, peak fluid velocity is minimized. Thus, valve 100 attenuates vibration and cavitation. This is useful in gas flow applications where the valve is subject to a high pressure drop ratio, where pressure drop ratio is defined as pressure drop divided by inlet pressure. This is also useful for minimizing cavitation in liquid flow operations as the principles are similar.

Figure 7:
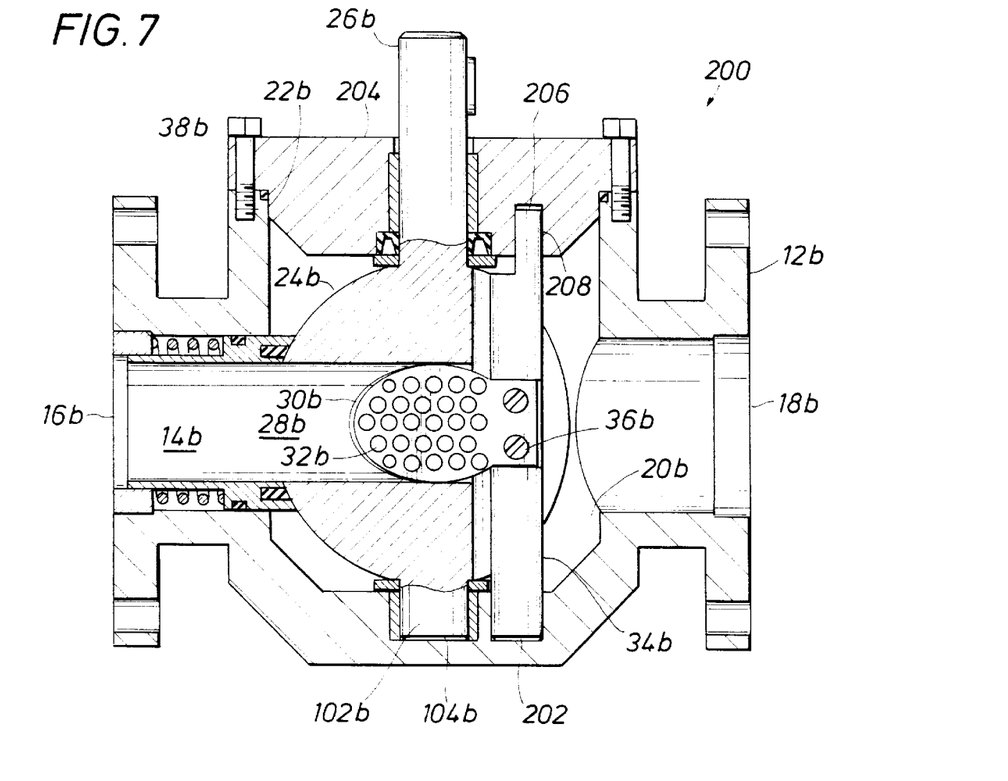
FIG. 7 is a cross-section of a valve according to the present invention.
Figure 8:
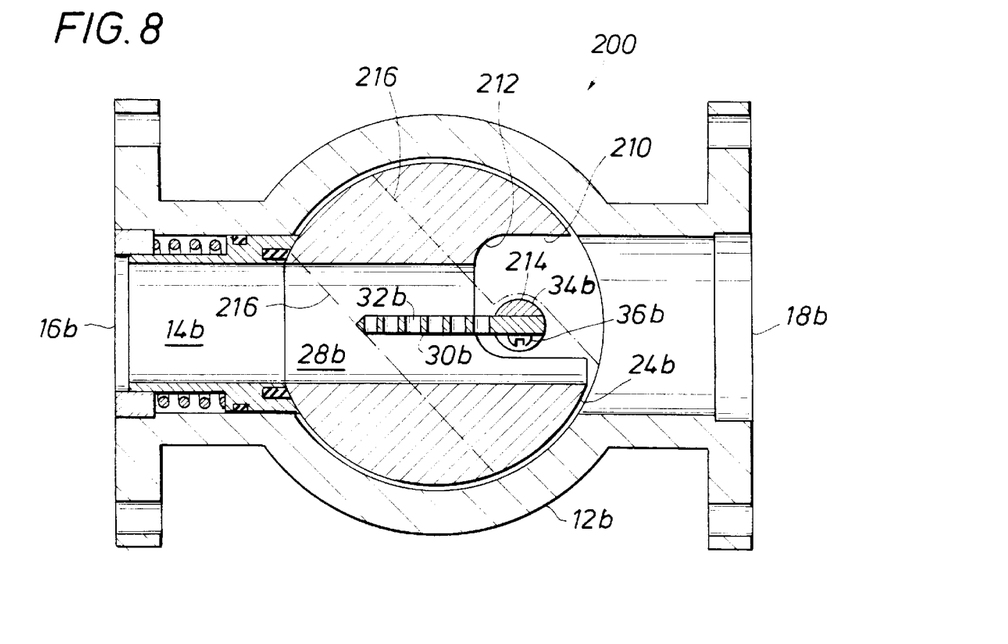
FIG. 8 is a cross section of the valve of FIG. 7 as seen along the lines 8—8.

Turning now to FIGS. 7 and 8, a valve 200 according to the present invention is shown schematically in cross section. Valve 200 has a valve body 12b, and valve body 12b has a bore 14b, an inlet 16b and an outlet 18b. Valve body 12b has a valve element cavity 20b and a port 22b providing access to valve element cavity 20b. A valve element 24b is received in valve element cavity 20b. Valve element 24b has a valve stem 26b and a valve stem extension 102b, and valve body 12b has a cavity 104b for receiving valve stem extension 102b, thus allowing valve element 24b to rotate within valve body 12b.

An internal diffuser 30b having openings 32b is disposed in a bore 28b within valve element 24b. A diffuser stem 34b supports internal diffuser 30b with bolts 36b fastening internal diffuser 30b to diffuser stem 34b. For receiving one end of diffuser stem 34b, valve body 12b has a cavity 202, and at an opposing end of diffuser stem 34b, a bonnet 204 has a D-shaped cavity 206 for receiving a D-shaped end 208 of diffuser stem 34b. D-shaped cavity 206 matingly receives D-shaped end 208 so that diffuser stem 34b is fixed in position and cannot rotate.

As best seen in FIG. 8, since diffuser stem 34b is not coaxial with valve stem 26b, a notch 210 is provided in valve element 24b for accommodating diffuser stem 34b. Notch 210 has a radial inside corner 212, and diffuser stem 34b has an outer surface 214. Radial inside corner 212 matingly engages outer surface 214 of diffuser stem 34b so that when valve element 24b is in a closed position as indicated by lines 216, radial inside corner 212 fits matingly about outer surface 214 of diffuser stem 34b. The diameter of bore 28b in valve element 24b is smaller than that in a conventional valve, so that valve element 24b is rotated into a closed position through a 45 degree arc rather than a 90 degree arc. In this manner, diffuser stem 34b and internal diffuser 30b are accommodated within bore 28b of valve element 24b. Internal diffuser 30b is in a fixed position relative to valve body 12b, but valve element 24b rotates about internal diffuser 30b.

Valve 200 illustrates one of many arrangements for locating an internal diffuser in a valve. In valve 200 internal diffuser 30b is placed in bore 28b of valve element 24b, but is not coaxial with valve stem 26b and valve stem extension 102b. In this arrangement diffuser stem 34b is placed parallel to valve stem 26b and valve stem extension 102b. By providing notch 210, valve element 24b is able to rotate about internal diffuser 30b.

Figures 9, 10, 11, 12:
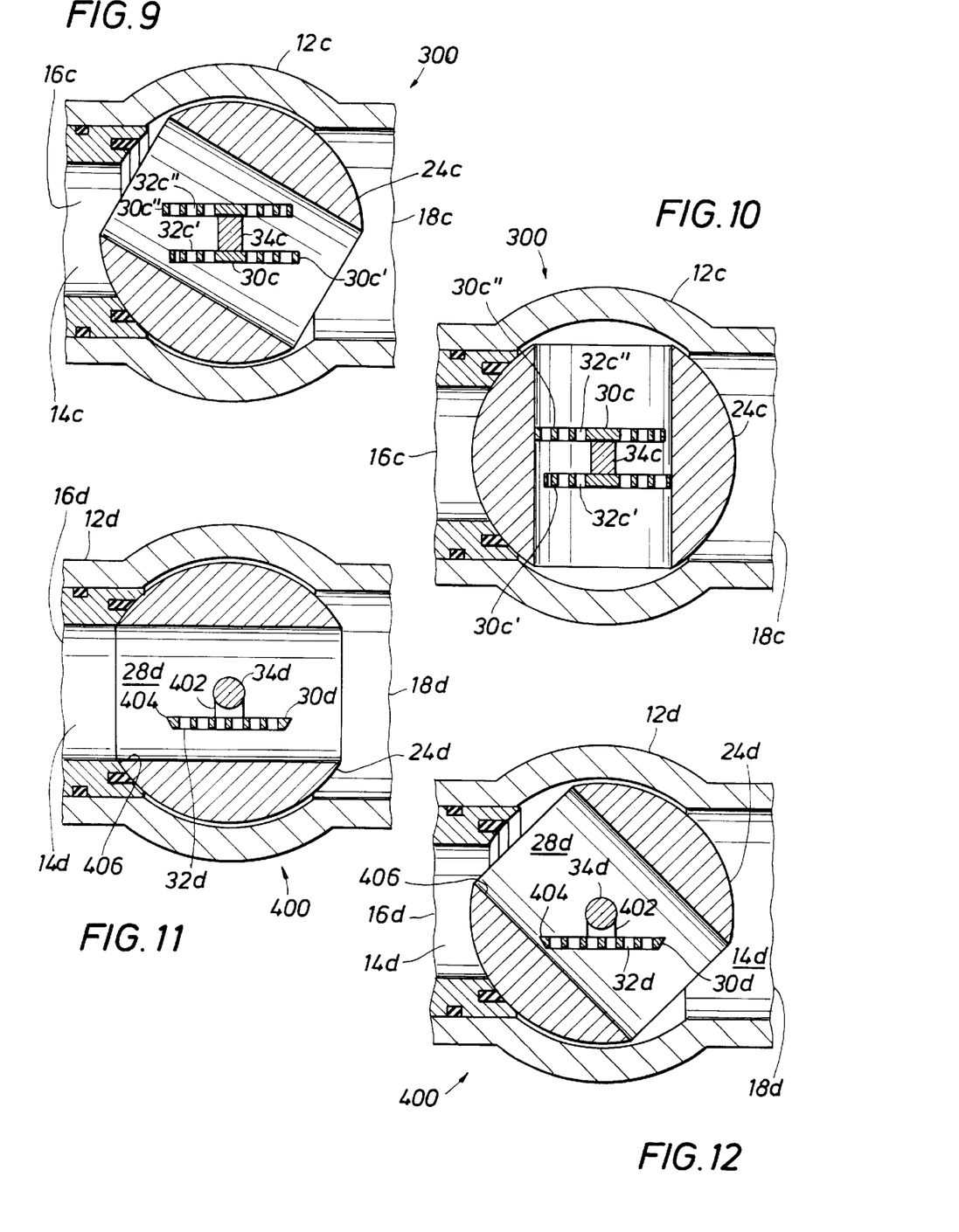
FIG. 9 is a partial cross section of a valve having an internal diffuser according to the present invention.
FIG. 10 shows the valve of FIG. 9 with the valve element in a fully closed position.
FIG. 11 is a partial cross section of a valve having an internal diffuser according to the present invention.
FIG. 12 shows the valve of FIG. 11 with the valve element in a nearly closed position.

A valve 300 having an internal diffuser 30c according to the present invention is illustrated schematically in partial cross section in FIGS. 9 and 10. Valve 300 has a body 12c, and body 12c has a bore 14c extending between an inlet 16c and an outlet 18c. A valve element 24c is disposed within body 12c between inlet 16c and outlet 18c. Similar to the embodiment illustrated in FIG. 5, valve 300 has a diffuser stem 34c to which is attached internal diffuser 30c.

Valve element 24c rotates about internal diffuser 30c. Internal diffuser 30c can be either fixed relative to body 12c or pivotable relative to body 12c. In the case where internal diffuser 30c is fixed relative to valve body 12c, an arrangement similar to that described with reference to FIG. 1 can be used. In the case where internal diffuser 30c is rotatable within valve body 12c, then an arrangement analogous to that described with reference to FIG. 5 can be used. In either case internal diffuser 30c is disposed within the bore of valve 300, and valve element 24c is rotatable with respect to internal diffuser 30c. Internal diffuser 30c may or may not be rotatable with respect to valve body 12c, this being optional with a selection depending upon a particular application.

Internal diffuser 30c has a first diffuser plate 30c' and a second diffuser plate 30c" each having openings 32c' and 32c". Openings 32c' and 32c" may be unaligned to provide a more tortuous flow path. Each diffuser plate 30c' or 30c" provides a component within valve 300 for providing pressure drop. Each additional component within a valve for taking pressure drop spreads the overall pressure drop taken by the valve through more components within the valve. Having an additional component within the valve for taking pressure drop spreads the overall pressure drop within the valve more evenly and thus reduces the pressure drop ratio for each component contributing to overall pressure drop. Thus, this reduces the magnitude of localized high pressure drop areas or high pressure drop ratio zones, which reduces localized velocity so as to attenuate vibration or cavitation within a valve.

According to the present invention, a valve 400 has an internal diffuser 30d eccentrically arranged on a diffuser stem 34d as shown in FIGS. 11 and 12. Valve 400 has a valve body 12d, and valve body 12d has a bore 14d and an inlet and outlet 16d and 18d, respectively. A valve element 24d is disposed within valve body 12d between inlet 16d and outlet 18d. Valve element 24d has a bore 28d which is selectively alignable with bore 14d in valve body 12d. Valve element 24d has a valve stem 26d (not shown) for rotating valve element 24d between an opened position (FIG. 11) and a closed position (not shown) with intermediate positions in between (FIG. 12).

Diffuser stem 34d extends through valve element 24d within bore 28d by any suitable means including the arrangements described above with reference to FIGS. 1 and 5. A mounting bracket 402 is provided on diffuser stem 34d for mounting internal diffuser 30d onto diffuser stem 34d. Internal diffuser 30d has openings 32d through which fluid in bore 28d can pass. Internal diffuser 30d has an edge 404, and bore 28d has an inside wall 406. Internal diffuser 30d is sized so that valve element 24d can rotate into a closed position without edge 404 of internal diffuser 30d contacting inside wall 406 of bore 28d.

Valve element 24d rotates about internal diffuser 30d and diffuser stem 34d. Internal diffuser 30d may be fixed as was described with reference to FIG. 1, or internal diffuser 30d may be rotatable within valve body 12d as was described with reference to FIG. 5. In either case valve element 24d rotates with respect to internal diffuser 30d. Further in either case, internal diffuser 30d provides an additional component within valve 400 for taking pressure drop of a fluid passing through valve 400. Thus, valve 400 provides noise attenuation for gas applications and minimizes cavitation in liquid applications.

Figure 13:
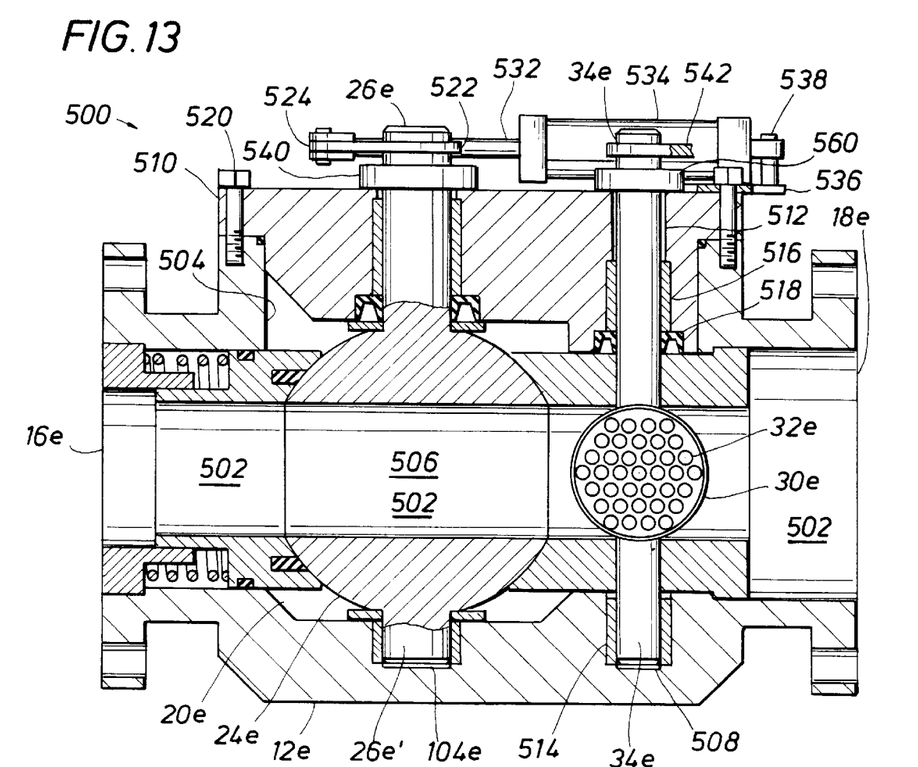
FIG. 13 is a cross section of a valve having an internal diffuser according to the present invention.
Figure 14:
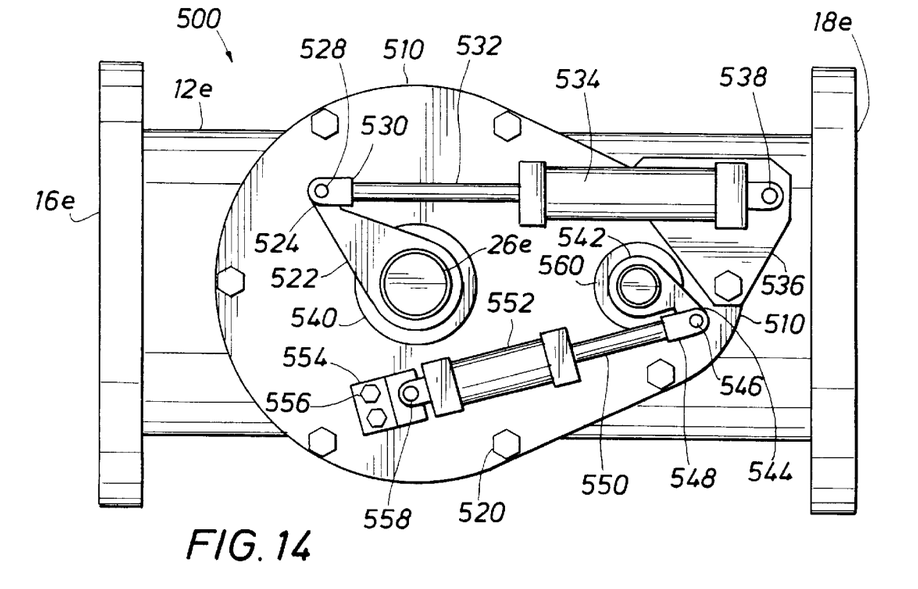
FIG. 14 is a top view of the valve of FIG. 13 illustrating independent rotation of the valve element and the internal diffuser.

Turning now to FIGS. 13 and 14, a valve 500 according to the present invention is illustrated. Valve 500 has a valve body 12e, and valve body 12e has a bore 502 extending the length of the valve from an inlet 16e to an outlet 18e. Bore 502 provides a passageway for fluid to flow through valve 500. Valve body 12e has a valve element cavity 20e and a port 504 for providing access to valve element cavity 20e. A valve element 24e is disposed in valve element cavity 20e between inlet 16e and outlet 18e. Valve element 24e has a bore 506 which is selectively alignable with and coaxial with bore 502. Valve element 24e has a valve stem 26e and a valve stem extension 26e', and valve body 12c has a cavity 104e for receiving valve stem extension 26e'. An internal diffuser 30e having openings 32e is disposed in bore 502 and mounted on a diffuser stem 34e. Valve body 12e has a cavity 508 for receiving a lower end of diffuser stem 34e. A bonnet 510 has a hole 512 for receiving an upper end of diffuser stem 34e. Bearings 514 and 516 allow diffuser stem 34e to rotate easily, and a seal 518 provides a fluid-tight seal around diffuser stem 34e. Bolts 520 hold bonnet 510 in place which holds bearing 516 and seal 518 in place.

As best seen in FIG. 14, a bracket 522 is fastened to valve stem 26e, typically by welding. Distal from valve stem 26e, bracket 522 has a pivot end 524 which has a hole 526 (not shown) for receiving a pivot pin 528 for pivotably fastening a pivot 530 to bracket 522. A piston rod 532 is connected to pivot 530, and piston rod 532 is received at an opposing end by a cylinder 534. A plate 536 is fastened to bonnet 510 by bolts 520. Cylinder 534 is fastened to plate 536 by a bolt 538. Conventional fluid lines and a conventional controller are integrated with cylinder 534 for reciprocating piston rod 532. Valve element 24e is shown in its fully opened position, and piston rod 532 is fully extended from cylinder 534. When piston rod 532 is fully retracted in cylinder 534, valve element 24e is in a fully closed position (not shown). Intermediate positions are provided by extending piston rod 532 to intermediate positions between fully extended and fully retracted. A conventional positioner 540 provides a feedback mechanism for positioning valve element 24e in a desired position.

A bracket 542 is fixed to diffuser stem 34e, typically by welding. Bracket 542 has a pivot end 544 which has a hole (not shown). A pin 546 fastens a pivot 548 to pivot end 544 of bracket 542. A piston rod 550 is fastened to pivot 548, and a cylinder 552 receives piston rod 550 at an end distal to pivot 548. A plate 554 is fastened to bonnet 510 by bolts 556. A bolt 558 fastens cylinder 552 to plate 554. A positioner 560 provides feedback control for rotating diffuser stem 34e and internal diffuser 30e in a desired orientation.

A conventional controller can be provided with cylinder 552, piston rod 550 and diffuser stem 34e for positioning internal diffuser 30e in a desired orientation. Piston rod 550 can be reciprocated to and fro by applying pressure in cylinder 552. Cylinder 552 can use a spring to return piston rod 550 to an unpressured position and use pressure within cylinder 552 to move piston rod 550, and consequently internal diffuser 30e, to alternative positions, storing energy in the spring which, when pressure is released, will return piston rod 550 and internal diffuser 30e to its original position. While a cylinder and piston arrangement have been illustrated here, any other means for rotating valve element 24e and internal diffuser 30e can be used.

Thus, in valve 500 internal diffuser 30e is rotatable with respect to valve body 12e, and valve element 24e is rotatable with respect to internal diffuser 30e. Internal diffuser 30e can be rotated independently of valve element 24e. Unlike valve 100 illustrated in FIG. 6, valve 500 in FIG. 14 has cylinder 552 anchored to bonnet 510 so that diffuser stem 34e can be rotated independently of valve stem 26e. An external control system can be integrated with valve 500 to move valve element 24e and internal diffuser 30e independently to maintain desired parameters. Sensors can be used to measure these desired parameters for input to the control system, and the control system can provide outputs for manipulating the position of valve element 24e and internal diffuser 30e. For example, a flow measurement may be provided as an input for a control strategy wherein valve element 24e is manipulated to maintain a particular flow rate. A vibration sensor may be provided as an input to a control strategy wherein internal diffuser 30e is rotated to minimize vibration using a feedback controller. In any case, valve 500 illustrates that an internal diffuser can be placed in a valve bore with rotation independent of the valve element, and/or valve 500 illustrates placement of the internal diffuser outside the bore of the valve element, but inside the bore of the valve. The internal diffuser can be either upstream of or downstream of the valve element.

Figures 15, 16, 17, 18:
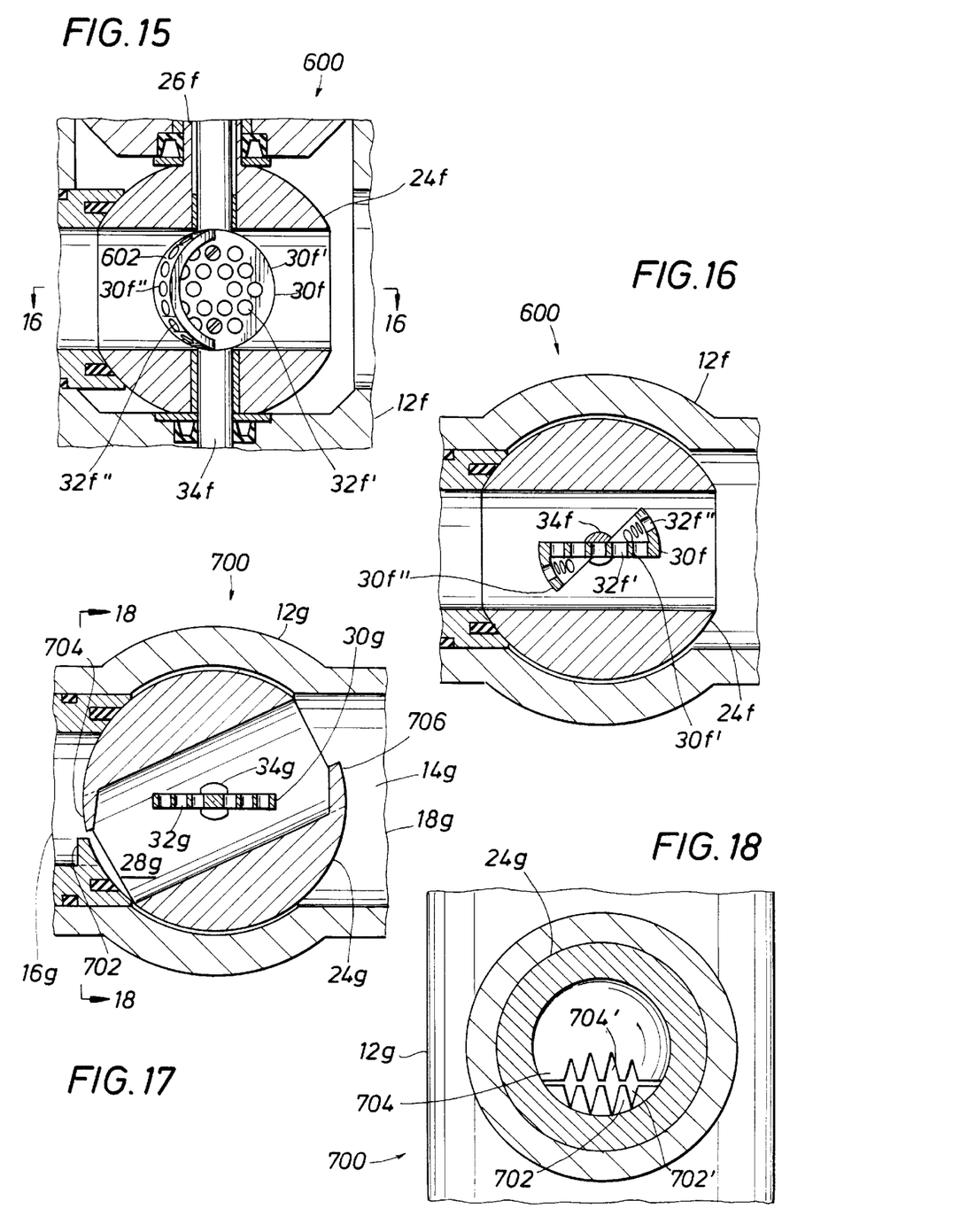
FIG. 15 is a partial cross section of a valve having an internal diffuser according to the present invention.
FIG. 16 is a cross section of the valve of FIG. 15 as seen along the lines 16—16.
FIG. 17 is a partial cross section of a valve having flow diffusers and an internal diffuser according to the present invention.
FIG. 18 is the valve of FIG. 17 as seen along the lines 18—18.

Turning now to FIGS. 15 and 16, a valve 600 according to the present invention is illustrated in partial cross section. Valve 600 has a valve body 12f and a valve element 24f. A valve stem 26f connects with valve element 24f for rotating valve element 24f with respect to valve body 12f. An internal diffuser 30f is disposed in a bore of valve element 24f and is secured to a diffuser stem 34f. Internal diffuser 30f and diffuser stem 34f can be either fixed or rotatable. Internal diffuser 30f has a diffuser plate 30f' from which project extensions 30f". Internal diffuser 30f has openings 32f, and diffuser plate 30f' has openings 32f' while extensions 30f" have openings 32f". Extensions 30f" have a curved face 602 for allowing rotation of valve element 24f about internal diffuser 30f, extensions 30f" and curved face 602 fitting within the bore of valve element 24f.

As valve element 24f is rotated towards a closed position with respect to internal diffuser 30f, fluid will be forced to flow through openings 32f' and 32f". Valve 600 provides additional components within itself for taking pressure drop as a fluid passes through it. Both diffuser plate 30f' and extensions 30f" provide restrictions to fluid flow through valve 600. Internal diffuser 30f provides a greater flow restriction than would internal diffuser 30 in valve 10 since extensions 30f" lie within the flow path of a fluid passing through valve 600. However, there are particular applications where this additional flow restriction is desirable. Thus, internal diffuser 30f with its diffuser plate 30f' and extensions 30f" provide an additional means for attenuating vibration or cavitation in a flow control valve.

A valve 700 is shown schematically in partial cross section in FIG. 17, and FIG. 18 illustrates valve 700 as seen along the lines 18—18 in FIG. 17. Valve 700 has a valve body 12g having an inlet 16g and an outlet 18g, valve 700 further having a bore 14g for fluid flow through valve 700. A valve element 24g is disposed between inlet 16g and outlet 18g, and valve element 24g has a bore 28g which is selectively alignable with bore 14g. A valve stem 26g (not shown) rotates valve element 24g within valve body 12g. An internal diffuser 30g is disposed in bore 28g of valve element 24g. Internal diffuser 30g is fastened to a diffuser stem 34g. Internal diffuser 30g has openings 32g for allowing fluid to flow through internal diffuser 30g.

As described in greater detail in U.S. Pat. No. 5,437,305, which is incorporated by reference, an inlet passage flow diffuser 702 extends into bore 14g from inlet 16g. Diametrically opposed to inlet passage flow diffuser 702, valve element 24g has a valve element inlet flow diffuser 704. Diametrically opposed to valve element inlet flow diffuser 704, valve element 24g has a valve element outlet flow diffuser 706. Valve element outlet flow diffuser 706, like valve element inlet flow diffuser 704, projects inwardly into bore 28g of valve element 24g. Flow diffusers 702, 704 and 706 may be full diffusers or partial diffusers. Partial flow diffusers divide a flow area into an unrestricted flow region and a restricted flow region, the restricted flow region being further divided into a lesser restricted flow region and a greater restricted flow region, wherein the lesser restricted flow region lies between the greater restricted flow region and an inside wall defining the bore in the valve. Partial flow diffusers are described in U.S. Pat. No. 5,758,689 issued to Leinen on Jun. 2, 1998, which is incorporated by reference.

Flow diffusers 702, 704 and 706 have openings 702', 704' and 706', respectively, for allowing passage of fluid through these diffusers. Thus, flow diffusers 702, 704 and 706 along with internal diffuser 30g, are all attenuators for reducing or attenuating vibration and cavitation in valve 700. Valve element 24g rotates about internal diffuser 30g, while internal diffuser 30g may or may not rotate with respect to valve body 12g. Further, internal diffuser 30g may have the configuration illustrated in any of the examples provided, these examples as well as others being contemplated by the invention.

Figure 19:
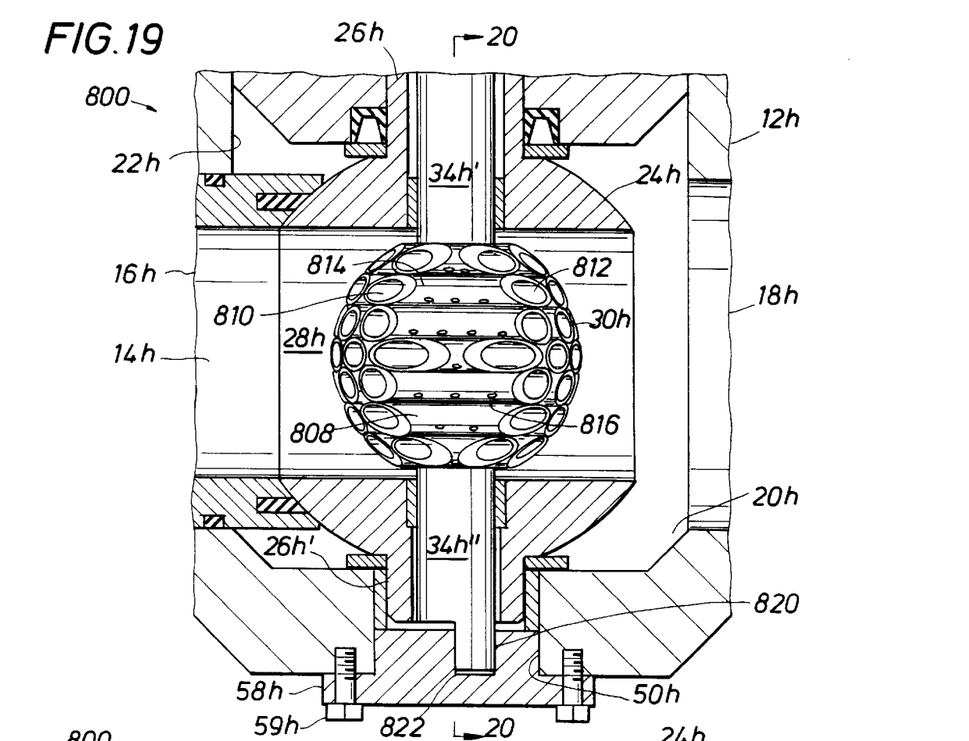
FIG. 19 is a cross section of a valve having an internal diffuser according to the present invention.
Figure 20:
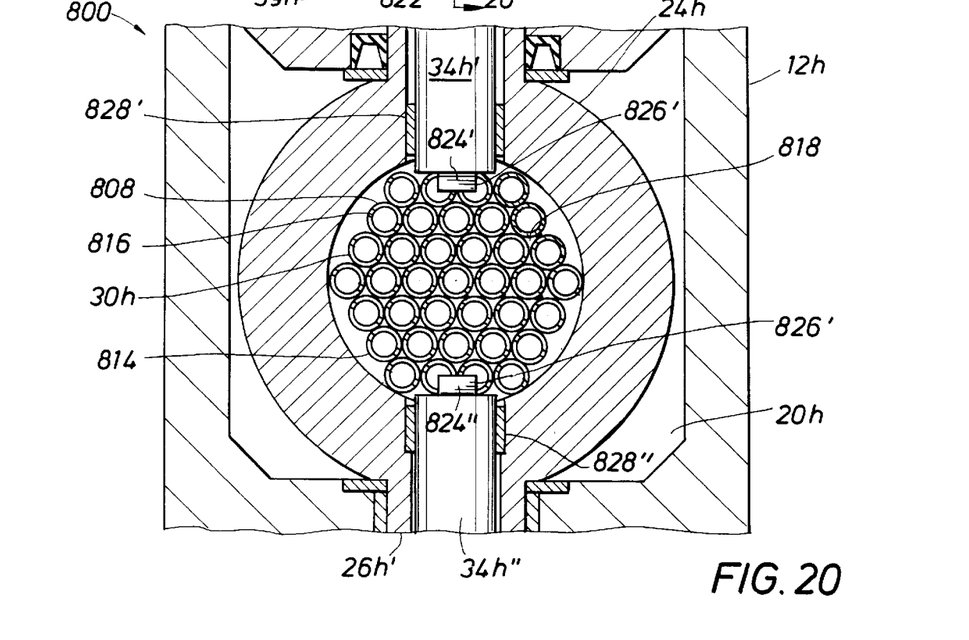
FIG. 20 is a cross section of the valve of FIG. 19 as seen along the lines 20—20.

Turning now to FIGS. 19 and 20, a valve 800 according to the present invention is illustrated in partial cross section. Valve 800 has a valve body 12h, and valve body 12h has a bore 14h, an inlet 16h and an outlet 18h. Valve body 12h has a valve element cavity 20h for receiving a valve element 24h through a port 22h. A valve stem 26h and a valve stem extension 26h' are connected with valve element 24h. Valve element 24h has a bore 28h which is selectively alignable with bore 14h, bore 28h coinciding with bore 14h when valve element 24h is in a fully opened position.

An internal diffuser 30h is disposed in bore 28h and is connected to diffuser stem 34h. Internal diffuser 30h is somewhat spherical in shape and comprises a plurality of tubes 808, each tube 808 having an inlet 810, an outlet 812 and walls 814. Walls 814 have holes 816, and where walls 814 of adjoining tubes 808 are in contact, an interstitial area 818 is defined. Holes 816 are directed into interstitial areas 818.

When internal diffuser 30h is in a fully opened position, tubes 808 are aligned parallel with stream flow in bores 14h and 28h. In the fully opened position, fluid flows in an inlet 810 of a tube 808 and out through an outlet 812 of the same tube 808. When internal diffuser 30h is in a fully closed position, while valve element 24h is in a fully opened position, fluid cannot readily enter an inlet 810 of tube 808, but can instead enter holes 816 and flow into interstitial area 818. From interstitial area 818, the fluid can pass through downstream holes 816 into a downstream interstitial area 818 and so forth through all of the tubes 808 until the fluid exits on a downstream side. Thus, in the fully closed position internal diffuser 30h serves as a porous media allowing limited fluid flow through a circuitous path. When tubes 808 are aligned with flow through bore 28h there is a lesser restriction to flow than when tubes 808 are not so aligned.

Internal diffuser 30h is fixed in position relative to valve body 12h, while valve element 24h rotates about internal diffuser 30h. A lower section 34h" of diffuser stem 34h has a D-shaped extension 820. Valve 800 has a diffuser cover plate 58h, and diffuser cover plate 58h has a D-shaped cavity 822 for matingly receiving D-shaped extension 820. Valve body 12h has a diffuser stem port 50h for receiving diffuser cover plate 58h. Bolts 59h secure diffuser cover plate 58h to valve body 12h. The engagement of D-shaped extension 820 with D-shaped cavity 822 prevents rotation of diffuser stem 34h at its lower section 34h".

An upper section 34h' of diffuser stem 34h and lower section 34h" have square projections 824' and 824", respectively. Diffuser 30h has square holes 826' and 826" for matingly receiving square projections 824' and 824", respectively. The engagement of square projections 824' and 824" with square holes 826' and 826" prevents rotation of internal diffuser 30h. Bearings 828' and 828" provide bearing surfaces for diffuser stem 34h' and 34h", respectively, for rotation of valve element 24h about internal diffuser 30h. Although internal diffuser 30h is illustrated as fixed with respect to valve body 12h, it can instead be rotatable.

Turning now to FIGS. 21–26, a valve 900 is illustrated according to the present invention. Valve 900 has a body 12i, body 12i having a bore 14i, an inlet 16i and an outlet 18i. Valve body 12i has a valve element cavity 20i and a port 22i for receiving a valve element 24i. A valve stem 26i and a valve stem extension 26i' are provided for rotating valve element 24i. Valve element 24i has a bore 28i which is selectively alignable with bore 14i of body 12i for providing a fluid passageway.

Figure 21:
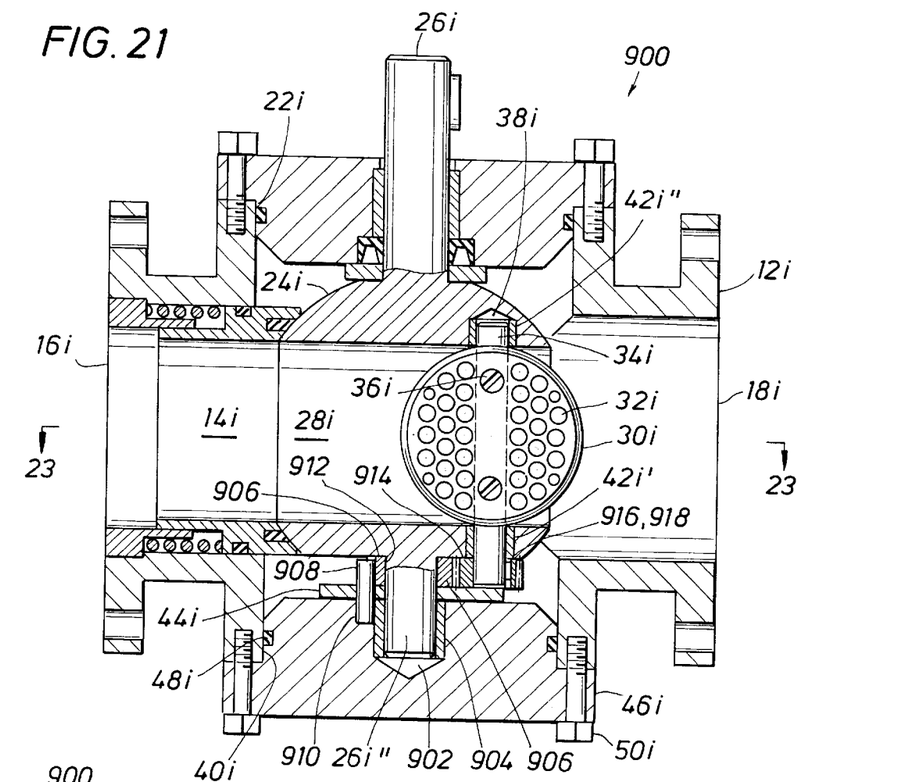
FIG. 21 is a cross section of a valve having an internal diffuser according to the present invention.

An internal diffuser 30i having openings 32i is fastened to a diffuser stem 34i using bolts 36i. Valve element 24i has a bore 38i for receiving diffuser stem 34i. Valve body 12i has a diffuser stem port 40i for allowing access to diffuser stem 34i. A lower diffuser bearing 42i' and an upper diffuser stem bearing 42i" are provided about diffuser stem 34i so that diffuser stem 34i can rotate easily within bore 38i. A washer 44i supports valve element 24i, and a diffuser cover plate 46i, sealed by a seal 48i and fastened by bolts 50i, provides a support for washer 44i. Diffuser cover plate 46i has a bore 902 for receiving valve stem extension 26i'. A bearing 904 is provided about valve stem extension 26i' for rotation of valve stem extension 26i' in port 902. Valve stem 26i is also provided with a bearing and seal system in a conventional manner.

Figure 22:
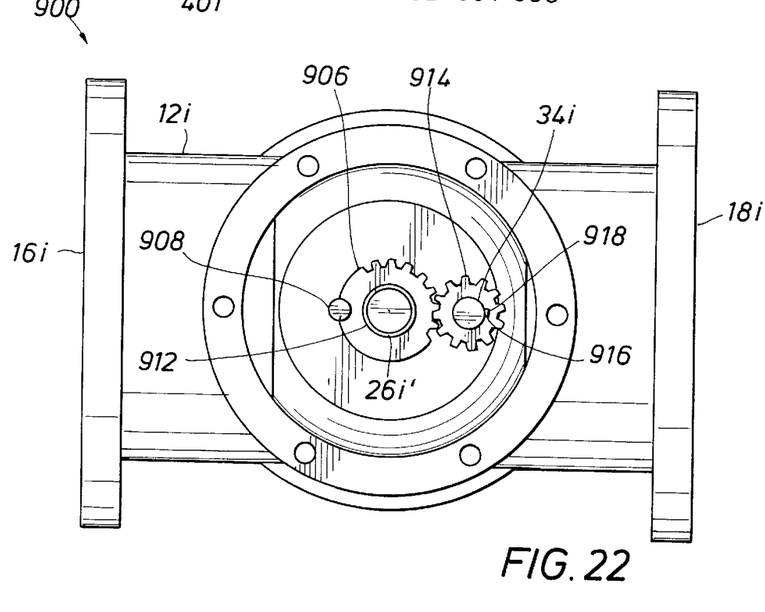
FIG. 22 is a bottom view of the valve of FIG. 21 with a diffuser cover plate removed to show a gear system for rotating the internal diffuser.

As best seen in FIG. 22, where diffuser cover plate 46i has been removed, internal diffuser 30i is rotated by a planetary gear system. A sun gear 906 is held in a fixed position by a pin 908. A bore 910 is provided in diffuser cover plate 46i for receiving pin 908. Valve stem extension 26i' rotates within an opening 912 in sun gear 906. Valve extension 26i' is free to rotate within sun gear 906 while sun gear 906 is fixed in position by pin 908. A planet gear 914 engages sun gear 906. A slot 916 is provided in diffuser stem 34i and planet gear 914 for receiving a key 918 for fastening planet gear 914 to diffuser stem 34i. As valve element 24i rotates, planet gear 914 revolves around sun gear 906. Consequently, internal diffuser 30i rotates as valve element 24i rotates.

Figures 23, 24, 25, 26:
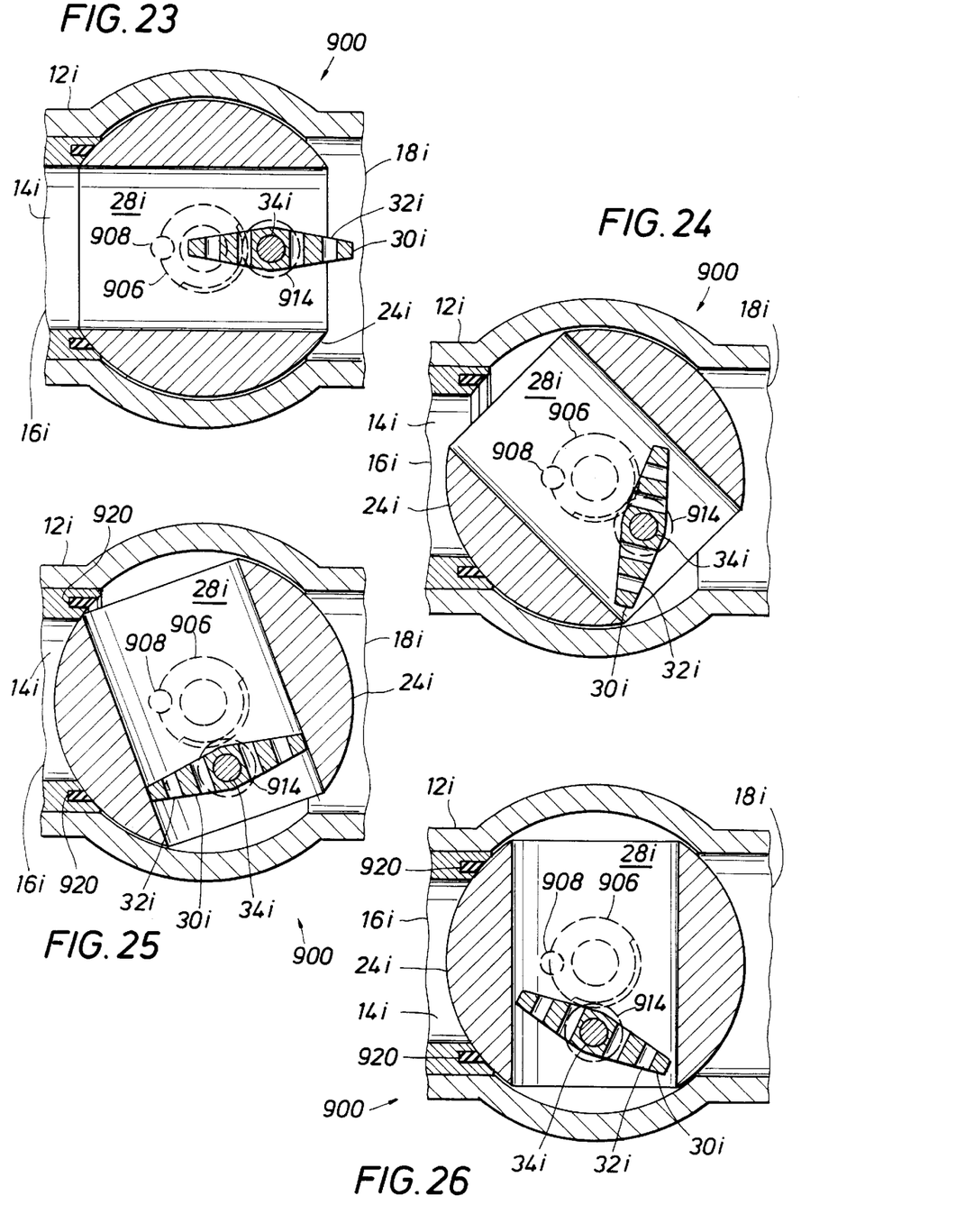
FIG. 23 is a cross section of the valve of FIG. 21 as seen along the lines 23—23 showing the valve element and the internal diffuser in a fully open position.
FIG. 24 illustrates a partially open position for the valve element and internal diffuser of FIG. 23.
FIG. 25 illustrates a position for the valve of FIG. 23 where the valve element is closed, but not yet sealed, illustrating a fully-closed position for the internal diffuser.
FIG. 26 illustrates a position for the valve of FIG. 23 where the valve element is fully closed and sealed, illustrating that the internal diffuser rotates past its fully-closed position.

The rotation of internal diffuser 30i with respect to valve element 24i is illustrated in FIGS. 23–26. In FIG. 23 valve element 24i and internal diffuser 30i are both in a fully open position. As valve element 24i rotates to a closed position, planet gear 914 revolves around sun gear 906, and as it does so, planet gear 914 rotates diffuser stem 34i and internal diffuser 30i (FIG. 24). When valve element 24i rotates to a barely closed position, internal diffuser 30i is rotated to a fully closed position (FIG. 25). Thus, internal diffuser 30i provides its greatest flow resistance when valve element 24i is nearly closed or barely open (FIG. 25). As valve element 24i rotates past a seal 920, internal diffuser 30i rotates past its fully closed position to a partially open position (FIG. 26). There is essentially no flow through bore 28i as valve element 24i rotates from a barely closed position (FIG. 25) to a fully closed and sealed position (FIG. 26). As valve element 24i is rotated from its fully closed and sealed position in FIG. 26 to its barely closed position in FIG. 25, planet gear 914 revolves in an opposite direction about sun gear 906 so as to rotate internal diffuser 30i into its fully closed position as illustrated in FIG. 25. As valve element 24i continues to rotate into an open position, internal diffuser 30i rotates from the position illustrated in FIG. 25 to a position such as illustrated in FIG. 24.

As valve element 24i rotates from a fully open position (FIG. 23) to a fully closed and sealed position (FIG. 26), it rotates through a 90° arc. Internal diffuser 30i rotates more than 90° as valve element 24i rotates 90°. Valve element 24i rotates approximately 70° from a fully open position (FIG. 23) to a barely closed or barely open position (FIG. 25), while internal diffuser 30i rotates about 90°. This relative motion is accomplished by proper sizing of planet gear 914 with respect to sun gear 906. The diameter of planet gear 914 is about ⅞ths of the diameter of sun gear 906. This allows diffuser stem 34i to rotate 90° as valve stem 26i rotates about 70°. The planetary gear arrangement should provide for internal diffuser 30i to be in its fully closed position as valve element 24i is in a barely open position. It is not necessary to provide teeth around the entire circumference of sun gear 906 because the range of movement of planet gear 914 is limited. Valve 900 thus provides a system for simultaneous rotation of valve stem 26i and diffuser stem 34i. A single actuator can be used to rotate valve stem 26i, and diffuser stem 34i rotates dependently with valve stem 26i.

It is thus illustrated that a number of different components can be provided in a valve for attenuating noise generation in a gas service or cavitation in a liquid service. In an application for throttling fluid flow while minimizing noise generation or cavitation, it is desirable to place as many components in a valve for reducing flow by restricting flow resulting in a pressure drop, each component taking a portion of the overall pressure drop through the valve. By having multiple components for taking pressure drop, the pressure drop ratio for each component is lower than if there were fewer components for taking pressure drop. The internal diffuser illustrated in various embodiments above provides such a component, which spreads pressure drop through the valve over an additional component, thus reducing localized high velocity regions which cause vibration or cavitation.

The diffuser stem has been illustrated either coaxial with or parallel to the valve stem. However, this is not a requirement, and the diffuser stem can be placed at an angle to the valve stem. For example, the valve stem can be placed in a vertical orientation while the diffuser stem is placed in a horizontal orientation.

The foregoing disclosure and description of the invention are illustrative and explanatory thereof, and various modifications and alterations to the embodiments disclosed herein will be apparent to those skilled in the art in view of this disclosure. It is intended that all such variations and modifications fall within the spirit and scope of this invention as claimed.

What is claimed is:

1. A control valve, comprising:

a valve body having an inlet and an outlet and a bore for fluid flow through the valve body;

a valve element disposed in the valve body between the inlet and the outlet, the valve element having a bore selectively alignable with the bore in the valve body thereby forming an inlet opening into the valve element and an outlet opening from the valve element; and an internal diffuser having a disk shape disposed within the bore of the valve element, the internal diffuser being approximately centered between and away from the inlet opening and the outlet opening, the internal diffuser providing a flow restriction in addition to any flow restriction provided by the inlet opening and the outlet opening and having at least one opening for allowing fluid flow through the internal diffuser, wherein the valve element is rotatable with respect to the internal diffuser.

2. The control valve of claim 1, further comprising a diffuser stem, wherein the internal diffuser is secured to the diffuser stem.

3. The control valve of claim 2, wherein the diffuser stem is rotatable with respect to the valve body.

4. The control valve of claim 3, wherein the rotative orientation of the diffuser stem is independent of the rotative orientation of the valve element.

5. The control valve of claim 1, wherein the disk is perforated.

6. The valve of claim 1, wherein the valve element is a ball valve element.

7. The valve of claim 1, wherein the internal diffuser has a plurality of openings for allowing fluid flow through the internal diffuser.

8. The control valve of claim 1, further comprising an inlet passage flow diffuser located in the bore in the valve body.

9. The control valve of claim 1, further comprising a valve element inlet flow diffuser secured to the valve element and located within the bore in the valve element at the inlet opening of the valve element.

10. The control valve of claim 1, further comprising a valve element outlet flow diffuser mounted to the valve element and located within the bore in the valve element at the outlet opening.

11. The control valve of claim 1, further comprising a valve element inlet flow diffuser attached to the valve element at the inlet opening and a valve element outlet flow diffuser attached to the valve element at the outlet opening.

12. The control valve of claim 11, further comprising an inlet passage flow diffuser mounted to the valve body and located in the bore in the valve body.

13. A valve comprising:

a valve body;

a valve element disposed in the valve body, wherein the valve body and the valve element each have a bore for defining a flow path for fluid flow through the valve body and the valve element, the valve element having an inlet opening and outlet opening and being pivotable so that the bore in the valve element is selectively alignable with the bore in the valve body;

a diffuser stem located in the flow path; and a disk-shaped internal diffuser encompassed within the flow path and approximately centered between the inlet opening and the outlet opening. the internal diffuser being secured to the diffuser stem, the internal diffuser having at least one opening for fluid flow through the internal diffuser, wherein the valve element is rotatable with respect to the internal diffuser.

14. The valve of claim 13, wherein the diffuser stem is rotatable with respect to the valve body.

15. The valve of claim 13, further comprising:

a valve actuator for rotating the valve element;

a diffuser actuator for rotating the diffuser stem; and a control system for rotating the valve element and the diffuser stem each to a desired position, the desired position being determined by the control system.

16. The valve of claim 15, wherein the control system includes a vibration sensor.

17. The valve of claim 15, wherein noise is controlled.

18. The valve of claim 13, wherein the valve element is a ball valve element.

19. The valve of claim 13, wherein the internal diffuser has a plurality of openings for allowing fluid flow through the internal diffuser.

20. The valve of claim 11, further comprising an inlet passage flow diffuser mounted in the bore in the valve body and a valve element inlet flow diffuser secured to the valve element at the inlet opening.

21. The valve of claim 20, further comprising a valve element outlet flow diffuser secured to the valve element between the internal diffuser and the outlet opening from the valve element.

22. A valve, comprising:

a valve body having an inlet and an outlet and a bore for fluid flow through the valve body;

a valve element disposed in the valve body between the inlet and the outlet, the valve element having an opening for fluid flow through the valve element, the opening being selectively alignable with the bore in the valve body for providing opened, intermediate and closed positions to regulate fluid flow through the bore in the valve body, the opening in the valve element and the bore in the valve body together providing a fluid flow path; and an internal diffuser disposed within the fluid flow path, the internal diffuser having at least one opening for allowing fluid flow through the internal diffuser, wherein the valve element is rotatable with respect to the internal diffuser, the fluid flowing through the fluid flow path having first and second portions, the first portion flowing through the internal diffuser and the second portion flowing around the internal diffuser, and wherein the valve element and the internal diffuser are in a cooperative relationship so that the first portion increases relative to the second portion as the valve element rotates from the opened position toward the closed position so that the internal diffuser increasingly restricts fluid flow as the valve element rotates toward the closed position.

23. The valve of claim 22, further comprising a diffuser stem, wherein the internal diffuser is secured to the diffuser stem.

24. The valve of claim 23, wherein the diffuser stem is rotatable with respect to the valve body.

25. The valve of claim 22, wherein the valve element is a plug.

26. The valve of claim 22, wherein the internal diffuser has the shape of a disk.

27. The valve of claim 26, wherein the internal diffuser is located in the opening in the valve element.

28. The valve of claim 22, further comprising a valve element inlet flow diffuser attached to the valve element and extending into the opening in the valve element.

29. The valve of claim 28, further comprising an inlet passage flow diffuser attached to the valve body and located in the bore in the valve body proximate to the valve element.

30. The valve of claim 29, further comprising a valve element outlet flow diffuser secured to the valve element and located in the opening in the valve element.

* * * * *

UNITED STATES PATENT AND TRADEMARK OFFICE
CERTIFICATE OF CORRECTION

PATENT NO.    : 6,029,702
DATED         : February 29, 2000
INVENTOR(S)   : Leinen et al.

It is certified that error appears in the above-identified patent and that said Letters Patent is hereby corrected as shown below:

<u>Title page,</u>
Insert -- [60] Provisional ………………….. 60/035,959 --

Signed and Sealed this

Twenty-fourth Day of September, 2002

Attest:

Attesting Officer

JAMES E. ROGAN
Director of the United States Patent and Trademark Office